United States

[11] 3,628,021

[72] Inventor Angus C. MacDonald
 10 Spear Lane, Denville, N.J. 07834
[21] Appl. No. 40,174
[22] Filed May 25, 1970
[45] Patented Dec. 14, 1971

[54] X-RAY COLLIMATOR HAVING A FIBER OPTIC LIGHT SOURCE THEREIN FOR ALIGNMENT PURPOSES
6 Claims, 7 Drawing Figs.
[52] U.S. Cl. .................................................. 250/105,
 250/227, 350/96
[51] Int. Cl. ...................................................... G03b 41/16
[50] Field of Search ........................................... 250/105,
 227; 350/96

[56] References Cited
UNITED STATES PATENTS
3,407,300 10/1968 Hansen ........................ 250/105
OTHER REFERENCES
" How AO Fiber Optic Light Guides Solve Illumination Problems," American Optical Company, Space Defense Division, Southbridge, Mass., July, 1968.

Primary Examiner—James W. Lawrence
Assistant Examiner—C. E. Church
Attorneys—Arthur J. Plantamura and Herbert G. Burkard ABSTRACT: X-ray collimator having a fiber optic light source attached thereto, and method for accurately aiming a collimated X-ray beam at a test sample using fiber optic light source.

INVENTOR.
ANGUS MacDONALD
BY *Herbert G Burkard*
ATTORNEY

PATENTED DEC14 1971 3,628,021

INVENTOR.
ANGUS MacDONALD

BY *Herbert G Burkard*

ATTORNEY

X-RAY COLLIMATOR HAVING A FIBER OPTIC LIGHT SOURCE THEREIN FOR ALIGNMENT PURPOSES

BACKGROUND OF THE INVENTION

Scientific X-ray apparatus are used to perform various analytical tests, such as determining the orientation of single crystals, determining the grain size of materials, determining the lattice structure of compounds or the position of the atoms therein, and the like. The apparatus generally consists of an X-ray source, and a camera containing an X-ray collimator.

Essentially, an X-ray collimator is a tube containing an arrangement of apertures which convert a beam of X-rays entering the tube into a beam in which all the exiting rays are essentially parallel. The exiting rays strike a test sample and any reactions between the X-rays and the test sample are recorded on film by the camera.

Such use of X-rays usually requires accurate aiming of the collimated X-ray beam onto the test sample. It would be useful, therefore, to be able to simulate the path of the X-ray beam with a beam of visible light which could be sent through the collimator onto the test sample prior to activating the X-ray source. The collimator and/or test sample could then be adjusted so that the visible beam strikes the desired region of the sample, thus insuring proper alignment of the subsequent X-ray beam. However, because of space limitations it is usually not possible to insert a standard light source between the X-ray source and the collimator so as to preaim the X-ray beam.

It is an object of this invention to provide a method for accurately aiming a collimated X-ray beam with respect to a test sample.

It is a further object of this invention to provide a method of sending visible light through an X-ray collimator so as to simulate the path of a subsequent collimated X-ray beam.

It is another object of this invention to provide a collimator having a visible light source attached thereto.

SUMMARY OF THE INVENTION

It has now been found in accordance with the instant invention that a fiber optic light source is ideally suited for use with the collimator of an X-ray apparatus.

A fiber optic light source is a bundle of one or more light-transmitting fibers, generally glass fibers, which transmits light therethrough. The fiber optic light source is narrow enough and flexible enough so that its emission end can fit inside the entrance aperture of the collimator, either directly or through an opening in the collimator which connects with the entrance aperture through a passageway. When energized the light simulates the path of travel of the subsequent X-ray beam and impinges upon the test sample. The collimator or test sample is then adjusted so the light strikes the desired portion of the test sample, thus insuring proper alignment of the subsequent X-ray beam.

The invention may be more fully understood by reference to the drawings, wherein.

DETAILED DESCRIPTION

Figure 1:
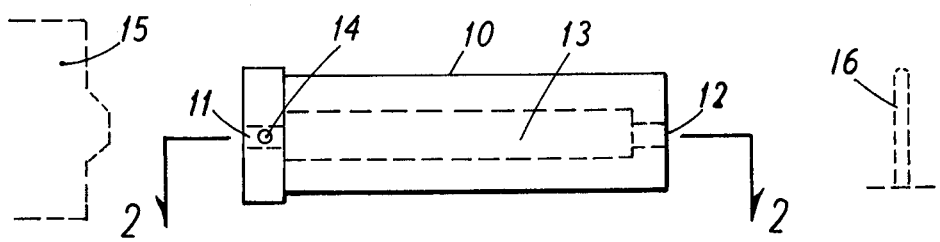
FIG. 1 is a side elevation view of an X-ray collimator.
Figure 2:
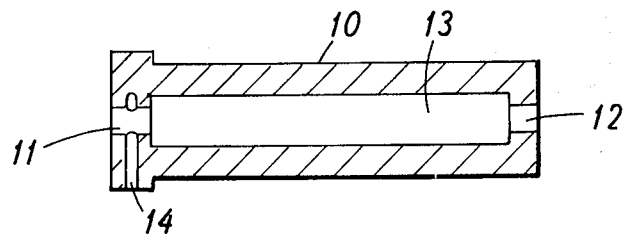
FIG. 2 is a top sectional view of the X-ray collimator taken in plane 2—2 of FIG. 1.
Figure 3:
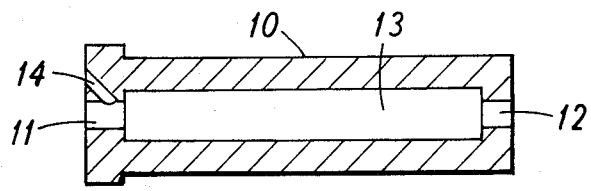
FIG. 3 is a top sectional view of an X-ray collimator showing an alternative opening for admitting the fiber optic light source.

The collimator employed in the practice of this invention may be any one of the standard types used by those skilled in the art of X-ray analysis. The collimator, as shown in FIGS. 1, 2 and 3, generally comprises a closed tube 10 having two apertures axially aligned with respect to each other, one aperture 11 at the entrance end for admitting a beam of X-rays and one aperture 12 at the exit end of said tube for emitting said beam. The apertures are connected by a conduit 13 axially aligned with said apertures and normally having a cross-sectional area larger than either aperture. The collimator may additionally have an opening and passageway 14 connecting with said entrance aperture 11 so that the emission end of a fiber optic light source may be inserted into the entrance aperture 11 through said opening and passageway, as when there is insufficient room between the X-ray source and the collimator for inserting the fiber optic light source into entrance aperture 11 directly. Generally, the angle between the longitudinal axis of the passageway 14 and the longitudinal axis of the entrance aperture ranges from about 45° to 135°, preferably the angle is about 90°. An X-ray source 15 and a test sample 16 are shown in phantom, but form no part of this invention.

Figure 4:
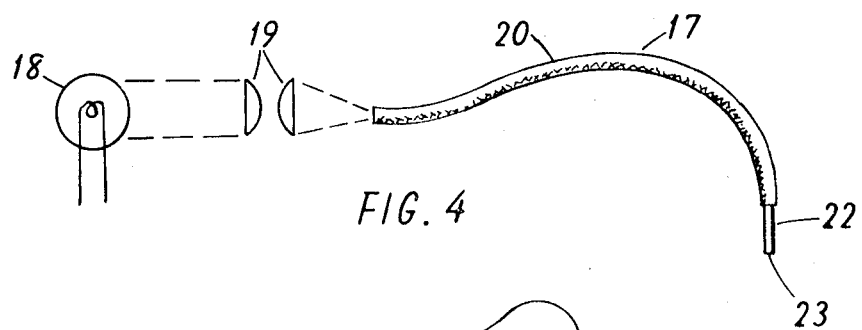
FIG. 4 is a schematic view of a fiber optic light source.
Figure 5:
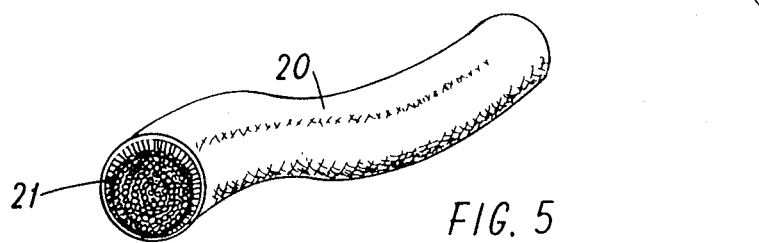
FIG. 5 is an enlarged perspective view of a fiber optic light source showing a flexible bundle of light-transmitting fibers with a portion of the protective sheath removed.

The fiber optic source inserted into the entrance aperture of the collimator may be any of the standard types. FIGS. 4 and 5 show a typical fiber optic light source 17 which generally includes a visible light source 18, one or more condensing lenses 19 and a flexible sheath 20 containing a plurality of light-transparent fiber elements 21, preferably glass, which make up the fiber bundle. The distal end of the fiber bundle may be formed into one of a variety of shapes, a preferred shape being a cylindrical rod 22, for example, a steel tube. The fiber bundle generally passes from the sheath into the cylindrical rod 22 and emerges from the emission end 23 of the rod, where the light appears as an intense small light source.

For effective alignment of the subsequent X-ray beam, it is necessary that the path of travel of the visible light in the collimator come as close as possible to simulating the path of travel of the subsequent X-ray beam. Thus, when the emission end of the fiber optic light source is not inserted into the entrance aperture of the collimator directly but rather through an opening and passageway in the collimator which connects with the entrance aperture, it is preferred that the emission end of the fiber optic light source include means, such as a mirror or prism, for bending or changing the direction of the emitted light so that the light will travel along essentially the same path as the subsequent X-ray beam and will be emitted at the exit of the collimator.

Figure 6:
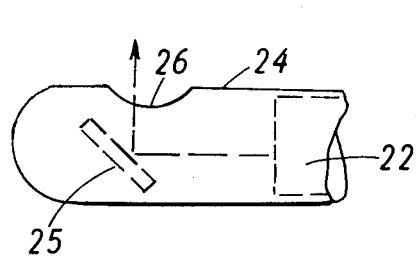
FIG. 6 is a side view of an attachment to the fiber optic light source for changing the direction of the emitted light.

FIG. 6 shows a conventional attachment 24 for the emission end 23 of the fiber optic light source, containing therein a mirror 25 so disposed as to change the direction of the light from the fiber optic light source. The light is emitted from the attachment through a hole 26 therein. Said hole can be open or covered with a light-transmitting material. When the fiber optic light source includes the attachment 24, then for purposes of this invention, the portion of the attachment containing the hole 26 is considered to be the emission end of the fiber optic light source.

Figure 7:
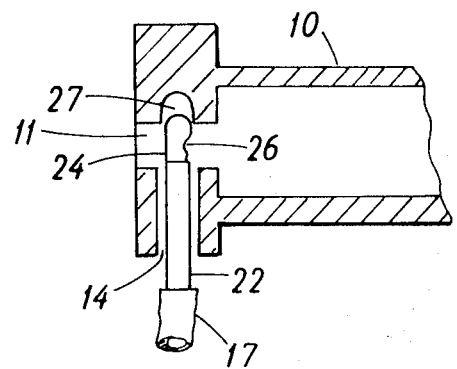
FIG. 7 is a top sectional view of the collimator showing an operative position of the fiber optic light source.

FIG. 7 shows a fiber optic light source having an attachment at the emission end thereof, inserted into the entrance aperture 11 through an opening an passageway 14 in the side of the collimator. The attachment 24 is so disposed in the passageway as to emit light in the direction of the exit aperture. It may also be necessary to have an indentation 27 in the wall of the entrance aperture coaxially opposite the passageway 14, so that the fiber optic light source can be inserted into the aperture a distance sufficient for the light from the hole 26 to clear the passageway and be emitted toward the exit aperture.

In the method of the instant invention, following the insertion and energization of the fiber optic light source, the spaced relationship between the collimator and test sample is adjusted, as by adjusting the test sample, so that the light from the exit aperture of the collimator impinges upon the desired region of the test sample. Thus, when the X-ray source is later activated, the X-ray beam likewise will impinge upon that particular region. The fiber optic light source is then withdrawn from the entrance aperture either totally or at least a distance sufficient to allow the subsequent X-ray beam to pass through the collimator unobstructed.

As is known in the art, e.g., U.S. Pat. No. 3,327,712, when the fiber elements are glass, each of the glass fibers of the bundle may have a diameter of form, for example, five microns to, for example, 50 microns. In order to reduce scattering of the light passing through the fiber bundle, each of the fiber elements thereof may be provided with a thin jacket of transparent material whose index of refraction is generally lower than the index of refraction of the glass fibers. An additional advantage of such a thin jacket is that it protects the fiber wall where total internal reflection takes place, maintaining it in its original clean and smooth condition.

Flexible glass fiber bundles may be made coherent or incoherent. A coherent bundle will transmit an image and is one in which the fibers at each end of the bundle have a corresponding arrangement. An incoherent bundle is entirely satisfactory for the light guide which does not need to transmit an image as in the present instance. It is much easier to make such bundles of randomly arranged fibers and in view of the savings in cost and the fact that it is unnecessary to transmit an image in this device, incoherent bundles of fibers are preferable.

The following example illustrates the invention but is not to be construed as limiting the same.

EXAMPLE 1

A back reflection X-ray photograph is to be taken to determine the orientation of a single crystal of copper. The copper sample is mounted in front of the exit aperture of a collimator and the emission end of a fiber optic light source is inserted into the entrance aperture through a passageway in the collimator, said passageway being perpendicular to the longitudinal axis of the entrance aperture. The light shines out of the collimator showing exactly where the X-ray beam will impinge upon the copper crystal. The copper sample is then adjusted so that the beam impinges upon the desired region of the copper sample. The fiber optic light source is then removed from the collimator and the X-ray photograph is taken in the normal manner.

I claim:
1. A method for obtaining accurate alignment of a collimated X-ray beam with respect to a test sample comprising:
    a. inserting the emission end of a fiber optic light source into the entrance aperture of the collimator of an X-ray apparatus, said apparatus comprising a source of X-ray beams and a collimator for said X-ray beams,
    b. so disposing said fiber optic light source in said entrance aperture that the light emitted from the fiber optic light source will pass through said collimator and be emitted from the exit aperture of the collimator,
    c. adjusting the spaced relationship between the collimator and the test sample so that light emitted from the exit aperture of the collimator impinges upon the desired region of the test sample, and
    d. withdrawing the fiber optic light source from the entrance aperture a sufficient distance to allow the X-ray beam to pass therethrough unobstructed.
2. The method of claim 1 wherein the emission end of the light source is inserted into the entrance aperture through an opening in the collimator connected to the entrance aperture by a passageway.
3. An X-ray collimator having:
    a. entrance and exit apertures,
    b. a conduit for the passage of X-rays axially aligned with said apertures,
    c. a separate opening in the collimator connected to the entrance aperture by an intersecting passageway,
    d. a fiber optic light source removably mounted in said entrance aperture and extending through said passageway, said light source being so disposed in said entrance aperture as to emit its light through the exit aperture.
4. The X-ray collimator of claim 3 wherein the fiber optic light source includes means for bending the light emitted therefrom in the direction of the exit aperture.
5. The X-ray collimator of claim 3 whrerein the angle between the longitudinal axis of the passageway and the longitudinal axis of the entrance aperture ranges from about 45° to about 135°.
6. The X-ray collimator of claim 5 wherein said angle is about 90°.

* * * * *